United States Patent
Nakao et al.

[15] 3,669,916
[45] June 13, 1972

[54] SOLUTION OF A GRAFT COPOLYMER OF CELLULOSE

[72] Inventors: Osakazu Nakao; Saburo Nakagawa; Juichi Hirose; Shigeyuki Yamazaki; Takashi Amano; Toshio Nakamura; Hiroyuki Yamamoto, all of Shizuoka Prefecture, Japan

[73] Assignee: Tomoegawa Paper Manufacturing Company Limited, Chuo-ku, Tokyo, Japan

[22] Filed: June 11, 1969

[21] Appl. No.: 832,452

[52] U.S. Cl...............260/17.4 GC, 204/159.12, 260/17 A, 260/32.4, 260/41 C
[51] Int. Cl.............................................C08c 21/32
[58] Field of Search...............260/17 A, 17.4 GC, 17.4 CL, 260/32.4; 204/159.12

[56] References Cited

UNITED STATES PATENTS

| | | | |
|---|---|---|---|
| 3,121,698 | 2/1964 | Orsino et al. | 260/17 A |
| 3,232,823 | 2/1966 | Sobolev | 260/17.4 GC |
| 3,372,132 | 3/1968 | Cruz | 260/17.4 GC |
| 3,405,081 | 10/1968 | Hata et al. | 260/17.4 CL |

Primary Examiner—William M. Short
Assistant Examiner—L. M. Phynes
Attorney—Watson, Cole, Grindle & Watson

[57] ABSTRACT

The present invention is directed to a solution of a graft copolymer of cellulose comprising a polar organic solvent or a mixed solvent containing a polar or organic solvent, nitrogen dioxide and a graft copolymer of cellulose. Such solution is capable of dissolving cellulose and various kinds of polymers.

1 Claim, No Drawings

SOLUTION OF A GRAFT COPOLYMER OF CELLULOSE

The present invention relates to a solution of a graft copolymer of cellulose.

Graft copolymers of cellulose often have the properties of both cellulose and a synthetic high molecular weight compound. Therefore, various kinds of graft copolymers of cellulose are synthesized and they attract much interest in industry.

Many proposals have been made regarding the utilization of graft copolymers of cellulose, however, the useful industrialization thereof is very minute. One of the reasons for the lack of use of such copolymers is that they possess poor molding properties and another has been the previous lack of solvents suitable for dissolving graft copolymers of cellulose.

For example, when attempts were made to use fibers comprising a styrene and methyl methacrylate graft copolymer of cellulose in a base stock of a resin impregnated laminate, the resistance of such fibers to beating increased with an increase in the degree of grafting and an unsatisfactory paper was produced.

Further, graft copolymers of cellulose are characterized by poor thermoplastic flow properties and it is difficult to produce a uniform laminate therefrom, for use in making paper, even by treatment with a hot press. In the fiber industry, graft copolymers of acrylonitrile and styrene and the cellulose in cotton and viscose fibers have been produced, but there is a tendency for the grafted polymer to coat the surface of the fiber and reduce its moisture absorption characteristics and affinity for dye.

An object of the present invention is to provide a solution of a graft copolymer of cellulose and to make it possible to produce films, fibers, papers, nonwoven fabrics, coating solutions, fibrids, adhesives or molding products therefrom.

A solution of a graft copolymer of cellulose can be produced by dissolving a graft copolymer of cellulose in a solution produced by mixing nitrogen dioxide (or nitrogen peroxide) with either a polar organic solvent which does not contain active hydrogen atoms or a mixed solvent comprising such a polar organic solvent and some other solvent.

In accordance with the invention, a number of solvents useful for dissolving various kinds of graft copolymers of cellulose have been discovered. Specifically, it has been found that graft copolymers of cellulose are soluble in solutions produced by mixing nitrogen dioxide (hereinafter referred to as $NO_2$) with either (1) a polar organic solvent which is capable of dissolving graft copolymers generally and which does not contain active hydrogen atoms such as the hydrogen atoms in OH, NH, $NH_2$ and SH radicals or (2) a mixed solvent comprising such a polar organic solvent and some other solvent. Thus, for example, a methyl methacrylate graft copolymer of cellulose is dissolved by a solution produced by adding $NO_2$ to a solvent for graft copolymers such as methyl formate, ethyl acetate, acetonitrile, nitromethane, acetone, methyl ethyl ketone, γ-butyrolactone, N, N'-dimethylformamide, dimethyl sulfoxide.

Also, solutions produced by adding $NO_2$ to a mixed solvent comprising a solvent for graft copolymers and another solvent such as, for example, benzene, toluene, methylene chloride, chloroform are successful in dissolving graft copolymers of cellulose.

It is generally difficult to dissolve graft copolymers of cellulose in organic solvents comprising compounds having active hydrogen atoms.

Further, the use of nonsolvents for graft copolymers is to be avoided generally because with such solvents graft copolymers are not solvated and the intermolecular forces of graft copolymers of cellulose would not be decreased.

In accordance with the present invention, a great number of organic solvents may be used for dissolving graft copolymers of cellulose having polymeric side chains soluble in organic solvents attached thereto by grafting.

According to the present invention, it is possible to prepare solutions of graft copolymers of cellulose having grafted side chains formed by polymerizing various kinds of monomers, such as, for example, acrylonitrile, styrene, vinyl acetate, vinyl chloride, vinylidene chloride, methyacrylates such as methyl methacrylate, ethyl methacrylate, n-propyl methacrylate, iso-propyl methacrylate, n-butyl methacrylate, and iso-butyl methacrylate, acrylates such as methyl acrylate, ethyl acrylate, n-propyl acrylate, iso-propyl acrylate, n-butyl acrylate, and iso-butyl acrylate, acrylic acid, methacrylic acid, butadiene, and comonomeric systems such as butadiene-styrene, butadiene-acrylo-nitrile, acrylonitrile-styrene, and methyl methacrylate-styrene onto cellulose from a source such as cotton linter, chemical wood pulp, reproduced cellulose, cotton or a cellulose derivative having a low substitution degree.

Films, fibers, nonwoven fabrics, papers and the like can be produced from solutions of graft copolymers of cellulose. For example, fibers made of the solution of an acrylonitrile graft copolymer of cellulose are highly hygroscopic. Transparent films produced from a solution of an ethyl acrylate graft copolymer of cellulose are tough and since the grafted polyethyl acrylate is a plasticizer, additives such as glycerol are not necessary. Accordingly, the properties of the film are not significantly affected by aging and it is suitable for use as a packaging material. Another advantage of the present invention is that it facilitates production of polymer blends comprising mixtures of graft copolymers of cellulose, various kinds of synthetic high molecular weight compounds, or naturally occurring high molecular weight compounds such as various kinds of cellulose derivatives and celluloses.

We have already discovered methods for producing mixed solutions of cellulose and various kinds of high molecular weight compounds. However, there are certain limitations in the mixing ratios of cellulose and the high molecular weight compound and there are also certain difficulties which have arisen in connection with the miscibility of these materials. However, the miscibility between cellulose and other high molecular weight compounds is remarkably improved by adding a suitable graft copolymer of cellulose.

Films, fibers and nonwoven fabrics made of solutions of blends have various properties which are different from products made from a single graft copolymer of cellulose. High molecular weight compounds capable of being mixed with graft copolymers of cellulose are, for example, synthetic high molecular weight compounds such as polyamides, polyesters, polycarbonates, polyvinyl chloride, polyvinyl acetate, polystyrene, polyacrylonitrile, polymethacrylate, polyacrylate, cellulose derivatives such as nitrocellulose and cyanoethyl cellulose, and natural high molecular weight compounds such as casein, gum arabic and cellulose. With high molecular weight compounds which are generally soluble in organic solvents, it may be possible to mix them in the solution of the graft copolymer of cellulose. However, with high molecular weight compounds which are generally not soluble in suitable organic solvents, such as, for example, polyethylene, polypropylene and polytetrafluoroethylene, it may be desirable to disperse a powder thereof in a solution of a graft copolymer of cellulose. Moreover, it may be desirable to incorporate inorganic and organic pigments, fillers and the like into the solution of the graft copolymer of cellulose. The process for making solutions of graft copolymers of cellulose according to the present invention are as follows:

A solution of a graft copolymer of cellulose can be produced by the steps of mixing the graft copolymer of cellulose, an appropriate organic solvent and $NO_2$ and stirring the mixture until a transparent and uniform solution is obtained. Also, such solution may be produced by the steps of soaking a graft copolymer of cellulose in an organic solvent to produce a slurry and thereafter introducing $NO_2$, as a gas or as a liquid. Such solutions may also be produced by adding the graft copolymer of cellulose to a solution of $NO_2$ in an organic solvent.

A graft copolymer of cellulose prepared by graft polymerizing sulfite pulp (degree of polymerization: about 1,000) with methyl methacrylate is easily dissolved to a 3 percent concentration by stirring slightly at room temperature under atmospheric conditions using N,N'-dimethylformamide as the solvent. Further, if the solution is stirred strongly by means of a kneader, it is possible to obtain a 5 percent concentration thereof in such solution. Generally, solubilization of graft copolymers of cellulose can be achieved at room temperature under atmospheric conditions. If necessary, it may be possible to utilize heating or increased pressure. The amount of $NO_2$ necessary for producing solutions of graft copolymers of cellulose generally varies in accordance with the kind of cellulose, the degree of polymerization and the kind of organic solvent used. The time necessary for complete dissolution also varies according to the kind of graft copolymer of cellulose, from several minutes to several hours.

In general, solutions of graft copolymers of cellulose prepared in accordance with this invention are viscous, transparent and colorless or greenish blue.

Fibers are produced by extrusion of such solutions from a nozzle into a nonsolvent such as water or methanol or by drying in air. Films are produced by casting solutions in a film form followed by regenerating with a nonsolvent or drying in air.

Production of fibrids is possible utilizing a method described in Japanese Pat. publication specification No. 5732/62, and production of paper or nonwoven fabrics is possible from such fibrids utilizing a paper machine.

The following specific examples are intended to show the nature of the invention without limiting it to the examples themselves, the amounts in the examples being given in parts by weight and the percentages being weight percentages. Degree of grafting is calculated from the following equation:

$$\text{Degree of grafting} = \frac{\text{Weight of the grafted polymer}}{\text{Weight of cellulose backbone}} \times 100 \, (\%)$$

Solubility of graft copolymers of cellulose is generally not related to the degree of grafting.

EXAMPLE 1

10 g. of dissolved sulfite pulp (degree of polymerization: about 1,000), 25 g. of ethyl methacrylate, 60 ml. of 0.1 N nitric acid and 300 ml. of water were charged to a reactor and a ceric ammonium nitrate catalyst was added in a concentration of $3 \times 10^{-3}$ mol/L. The mixture was allowed to react at 40° C. under a nitrogen atmosphere for 3 hours to obtain an ethyl methacrylate graft copolymer of cellulose having degree of grafting of 180 percent.

To 3 parts of this graft copolymer of cellulose were added 100 parts of an organic solvent to produce a slurry suspension, and $NO_2$ was introduced as a gas or a liquid and the mixture was stirred slightly at ordinary temperature under atmospheric conditions to obtain a greenish blue, transparent and viscous solution of a graft copolymer of cellulose.

The results are tabulated in Table 1.

The solubility of grafted polymers in each solvent is also tabulated in order to provide a comparison with the invention.

TABLE 1

Solubilities of ethyl methacrylate graft copolymer of cellulose in organic solvents + $NO_2$ (20°C.)

$o$ = Soluble, $x$ = insoluble

| Organic solvents (I) | solubility of grafted polymer in (I) | solubility of graft copolymer of cellulose in (I)+$NO_2$ | addition amount of $NO_2$ (part) |
|---|---|---|---|
| Methyl formate | o | o | 2 |
| Ethyl acetate | o | o | 2 |
| Methyl propionate | o | o | 3 |
| Tetrahydrofuran | o | o | 3 |
| Dioxane | o | o | 5 |
| Acetone | o | o | 5 |
| Methyl ethyl ketone | o | o | 4 |
| Acetophenone | o | o | 5 |
| Acetonitrile | o | o | 2 |
| Nitroethane | o | o | 2 |
| Diethyl carbonate | o | o | 3 |
| Propylene carbonate | o | o | 3 |
| N,N-dimethylformamide | o | o | 1 |
| Dimethyl sulfoxide | o | o | 1 |
| Isobutyl n-butyrate | o | o | 3 |
| Morpholine | o | o | 5 |
| Cellosolve | o | x | |
| Formamide | o | x | |
| Diethylamine | o | x | |
| n-hexane | x | x | |
| Cyclohexane | x | x | |
| Diethylene glycol | x | x | |

As understood from the Table 1, the ethyl methacrylate graft copolymer of cellulose dissolves easily in a a solution wherein $NO_2$ is added to a polar organic solvent which is a solvent for grafted polymers and which does not have any active hydrogen containing radicals such as OH, NH and $NH_2$.

EXAMPLE 2

A vinyl acetate graft copolymer of cellulose (degree of grafting: 25 percent) was synthesized and its solubility was examined in the same way as Example 1.

The results are tabulated in Table 2.

Table 2

Solubilities of vinyl acetate graft copolymer of cellulose (20°C.)

| Organic solvents (I) | Solubility of grafted polymer in (I) | solubility of graft copolymer of cellulose in (I)+$NO_2$ | addition amount of $NO_2$ (part) |
|---|---|---|---|
| Ethyl acetate | o | o | 4 |
| Ethyl cellulose acetate | o | o | 4 |
| Pyridine | o | o | 8 |
| N-methyl 2-pyrrolidone | o | o | 6 |
| Acetonitrile | o | o | 3 |
| Acetone | o | o | 8 |
| Methyl isobutyl ketone | o | o | 8 |
| Diethyl carbonate | o | o | 5 |
| Morpholine | o | o | 8 |
| N,N-diethylformamide | o | o | 4 |
| N,N-dimethylacetamide | o | o | 4 |
| 1-nitropropane | o | o | 5 |
| Methanol | o | o | |
| Cellosolve | o | x | |
| Cyclohexylamine | o | x | |
| Formamide | o | x | |

As can be seen from the table, solutions comprising $NO_2$ and a polar organic solvent for grafted polymers which does not contain active hydrogen atoms are capable of dissolving graft copolymers of cellulose.

EXAMPLE 3

In accordance with the same method as is set forth in Example 1, a methyl methacrylate graft copolymer of cellulose (degree of grafting: 178 percent) was synthesized. Solubility of the graft copolymer of cellulose so obtained was examined and the results are tabulated in the following Table 3.

TABLE 3

Solubilities of methyl methacrylate graft copolymer of cellulose (20°C.)

| Organic solvents (I) | Solubility of grafted polymer in (I) | solubility of graft copolymer of cellulose in (I)+$NO_2$ | addition amount of $NO_2$ (part) |
|---|---|---|---|

| | | | |
|---|---|---|---|
| Methyl acetate | o | o | 2 |
| Methyl propionate | o | o | 2 |
| Methyl butyrate | o | o | 3 |
| -butyrolacetone | o | o | 2 |
| Tetrahydrofuran | o | o | 5 |
| Methyl cellosolve acetate | o | o | 2 |
| Acetone | o | o | 4 |
| Methyl ethyl ketone | o | o | 4 |
| 2-nitropropane | o | o | 3 |
| N,N-dimethylformamide | o | o | 1 |
| N,N-dimethylpropionamide | o | o | 2 |
| Dimethyl sulfoxide | o | o | 1 |

EXAMPLE 4

An ethyl acrylate graft copolymer of cellulose (degree of grafting: 125 percent) synthesized according to Example 1 was dissolved in a solution containing 2 to 8 parts of $NO_2$ in the following organic solvents: ethyl acetate, methyl propionate, isopropyl propionate, diethyl carbonate, tetrahydrofuran, N,N-dimethylacetamide, isobutyronitrile, acetone, methyl ethyl ketone, acetophenone and dimethyl sulfoxide.

EXAMPLE 5

A styrene graft copolymer of cellulose (degree of grafting: 65 percent) synthesized in the same manner as in Example 1 was dissolved in a solution containing 2 to 8 parts of $NO_2$ in the following solvents: ethyl; acetate, n-butyl acetate, γ-butyrolactone, dioxane, pyridine, N-methyl 2-pyrrolidone, N,N-dimethylformamide, N,N-dimethylacetamide, propionitrile, dimethyl sulfoxide, ethyl nitrate and acetophenone.

EXAMPLE 6

An acrylonitrile graft copolymer of cellulose (degree of grafting: 86 percent) synthesized in the same manner as in Example 1 was dissolved in a solution containing 3 to 10 parts of $NO_2$ in the following organic solvents: N,N-dimethylformamide, N,N-dimethylacetamide, dimethyl sulfoxide, sulfolane, γ-butyrolactone, succino nitrile and dimethyl sulfone.

EXAMPLE 7

An n-Butyl methacrylate graft copolymer of cellulose (degree of grafting: 90 percent) synthesized in accordance with Example 1 was dissolved in a solution containing 3 to 10 parts of $NO_2$ in the following organic solvents: methyl formate, ethyl acetate, methyl butyrate, ethyl cellulose acetate, ethylene carbonate, N,N-dimethyl acetamide, tetramethyl urea, o-nitrotoluene, nitromethane, diethyl carbonate, n-propyl propionate and acetone.

EXAMPLE 8

A methyl acrylate graft copolymer of cellulose (degree of grafting: 40 percent) synthesized in the same manner as in Example 1 was dissolved in a solution containing 3 to 10 parts of $NO_2$ in the following organic solvents: n-propyl formate, methyl acetate, ethyl acetate, methyl propionate, methyl benzoate, benzylacetic acid, γ-valerolactone, tetrahydrofuran, N,N-dimethylformamide, N,N-dimethylacetamide, N-methyl 2-pyrrolidone, methyl thiocyanate, acetone, methyl isobutyl ketone, dimethyl sulfoxide.

EXAMPLE 9

An n-butyl acrylate graft copolymer of cellulose (degree of grafting: 150 percent) synthesized in the same manner as in Example 1 was dissolved in a solution wherein 2 to 8 parts of $NO_2$ were added to the following solvents: methyl formate, methyl acetate, ethyl acetate, γ-butyrolactone, tetrahydrofuran, dioxane, ethyl cellosolve acetate, acetone, methyl ethyl ketone, N,N-dimethylformamide, acetonitrile, methyl thiocyanate, dimethyl sulfoxide.

EXAMPLE 10

A methacrylic acid was graft-polymerized with a cellulose pretreated with hydrogen peroxide in the presence of ferrous sulfate to obtain a graft copolymer of cellulose (degree of grafting: 50 percent). Such graft copolymer of cellulose was dissolved in a solution containing 4 to 10 parts of $NO_2$ in the following organic solvents: N,N-dimethylformamide, N,N-diethylformamide, N,N-dimethylacetamide, dimethyl sulfoxide.

EXAMPLE 11

An acrylic acid graft copolymer of cellulose (degree of grafting: 40 percent) was synthesized in accordance with Example 10. Such graft copolymer of cellulose was dissolved in a solution containing 4 to 10 parts of $NO_2$ in the following organic solvents: N,N-dimethylformamide, N,N-diethylformamide, N,N-dimethylacetamide, N,N-dimethylpropionamide, dimethyl sulfoxide.

EXAMPLE 12

An acrylonitrile-styrene graft copolymer of cellulose (degree of grafting: 84 percent) was synthesized from acrylonitrile and styrene at a monomer ratio of 1 : 3 in accordance with Example 1. This graft copolymer of cellulose was dissolved in a solution containing 3 to 10 parts of $NO_2$ in the following solvents: N, N-dimethyl-dimethylformamide, N,N-diethylformamide, N,N-dimethylacetamide, dimethyl sulfoxide, γ-butyrolactone, sulfolane, N-methyl 2-pyrrolidone, succinonitrile.

EXAMPLE 13

A methyl methacrylate-acrylonitrile graft copolymer of cellulose (degree of grafting: 35 percent) was synthesized from methyl methacrylate and acrylonitrile at a monomer ratio of 1 : 4 in the same way as in Example 1.

Such graft copolymer of cellulose was dissolved in a solution containing 4 to 12 parts of $NO_2$ in the following organic solvents: N,N-dimethylformamide, N,N-diethylformamide, N,N-dimethylacetamide, N-methyl 2-pyrrolidone, γ-butyrolactone, dimethyl sulfoxide.

EXAMPLE 14

In accordance with Example 1, methyl methacrylate and styrene were graft-copolymerized at a monomer ratio of 1 : 1 to obtain a graft copolymer of cellulose (degree of grafting: 120 percent). The graft copolymer of cellulose was dissolved in a solution containing 2 to 8 parts of $NO_2$ in the following organic solvents: ethyl formate, ethyl acetate, n-butyl acetate, tetrahydrofuran, methyl cellosolve acetate, N,N-dimethylformamide, nitromethane, 1-nitropropane, dimethyl sulfoxide, acetonitrile.

EXAMPLE 15

In the same way as in Example 1, styrene and vinyl acetate were graft-copolymerized at a monomer ratio of 1 : 1 to obtain a styrene-vinyl acetate graft copolymer of cellulose (degree of grafting: 54 percent). Such graft copolymer of cellulose was dissolved in a solution containing 3 to 10 parts of $NO_2$ in the following organic solvents: ethylacetate, n-butyl-acetate, ethyl propionate, isopropyl propionate, methyl benzoate, γ-butyrolactone, pyridine, N-methyl 2-pyrrolidone, tetramethyl urea, acetonitrile, nitromethane, 2-nitropropane, ethyl nitrate, acetone, methyl ethyl ketone, N,N-dimethylformamide, dimethyl sulfoxide, dioxane, tetrahydrofuran.

EXAMPLE 16

85 parts of styrene, 15 parts of butadiene and 10 parts of sulfite pulp were mixed, and from the mixture, a styrene-butadiene graft copolymer of cellulose (degree of grafting: 125 percent) was synthesized by means of a simultaneous grafting technique using a cobalt 60 gamma ray. This graft copolymer of cellulose was dissolved in a solution containing 3 to 12 parts of NO₂ in the following organic solvents: N,N-dimethylformamide, dimethyl sulfoxide, N,N-dimethylacetamide, γ-butyrolactone, γ-valerolactone, N,N-dimethyl propionamide, tetramethyl urea, N-methyl 2-pyrrolidone.

EXAMPLE 17

50 parts of acrylonitrile, 50 parts of butadiene and 10 parts of sulfite pulp were mixed. From the mixture, an acrylonitrile-butadiene graft copolymer of cellulose (degree of grafting: 190 percent) was synthesized by means of a simultaneous grafting technique using a cobalt 60 gamma ray. This graft copolymer of cellulose was dissolved in a solution containing 3 to 12 parts of NO₂ in the following organic solvents: N,N-dimethylformamide, N,N-dimethylacetamide, dimethyl sulfoxide, N,N-dimethyl propionamide, γ-butyrolactone.

EXAMPLE 18

In accordance with the above methods, graft copolymers of cellulose were also dissolved in solutions wherein NO₂ was added to mixed solvents comprising two or more kinds of organic solvents.

In each case 3 parts of a methyl methacrylate graft copolymer of cellulose (degree of grafting: 178 percent) were added to 100 parts of a mixed solvent, and NO₂ was added to dissolve the copolymer. The results are tabulated in Table 4.

TABLE 4

Solubilities of methyl methacrylate graft copolymer of cellulose in mixed solvent

| Mixed solvent | Mixing ratio | Addition amount of NO₂ (part) |
|---|---|---|
| Acetonitrile + toluene | 3:7 | 1 |
| Acetonitrile + benzene | 7:3 | 1 |
| Methyl formate + benzene | 5:5 | 1.5 |
| N,N-dimethylformamide + methylene chloride | 3:7 | 0.5 |
| Nitromethane + ethyl acetate | 4:6 | 1 |

Mixtures containing benzene or toluene are low in cost while mixtures containing a volatile solvent such as methylene chloride result in rapid evaporation of solvent. Moreover, various mixtures may be utilized for such purposes as shortening solubilization time, lowering viscosity and decreasing the quantity of NO₂ required.

EXAMPLE 19

In the same way as in Example 18, the solubility of a styrene graft copolymer of cellulose (degree of grafting: 65 percent) in mixed solvents was examined, and it was found that such graft copolymer of cellulose was soluble in the following mixed solvents.

TABLE 5

Solubilities of styrene graft copolymer of cellulose in mixed solvent

| Mixed solvent | Mixing ratio | Addition amount of NO₂ (part) |
|---|---|---|
| Methyl formate + toluene | 2:8 | 2 |
| Acetonitrile + carbon tetrachloride | 5:5 | 2 |
| N,N-dimethylformamide + chloroform | 3:7 | 1.5 |
| Ethyl acetate + acetone | 5:5 | 1.5 |

EXAMPLE 20

An ethyl acrylate graft copolymer of cellulose (degree of grafting: 30 percent) was dissolved in a solution comprising NO₂ in ethyl acetate to make a 5 percent solution of the graft copolymer. This solution was cast to a glass plate, dried at 40° C. for about 30 minutes and soaked in water to completely remove residual NO₂ content.

The film obtained was transparent and soft and had a tensile strength of 8 Kg./mm² and elongation of 10 percent.

Since the film did not contain glycerol and therefore resisted change upon aging, it was suitable for use as a packaging material.

EXAMPLE 21

A styrene graft copolymer of cellulose (degree of grafting: 120 percent) was suspended as a slurry in N,N-dimethylformamide and NO₂ was introduced as a gas to thereby dissolve the graft copolymer of cellulose and produce a 4 percent solution thereof. By means of the method described in Japanese patent publication specification No. 5732/62, the solution was jetted from a nozzle 0.6 mm in diameter into a body of water which was rotated at a high speed, to produce a fibrid.

Nonwoven fabric sheets from the fibrid were produced.

EXAMPLE 22

2 parts of a polycarbonate were dissolved in a mixed solvent comprising 50 parts of N,N-dimethylformamide and 50 parts of methylene chloride, and 4 parts of a n-butyl acrylate graft copolymer of cellulose were added to the solution. 3 parts of NO₂ were added to dissolve the graft copolymer. The solution obtained was cast on a glass plate, dried at 40° C. and soaked in water to coagulate and to regenerate it. The film obtained was transparent, tough and soft.

EXAMPLE 23

An acrylonitrile graft copolymer of cellulose (degree of grafting: 45 percent) was dissolved in a solution of dimethyl sulfoxide and NO₂ to make a 5 percent solution. The solution was extruded into water from a spinning nozzle, coagulated and reproduced to obtain a fine fiber. The fiber was twice as hygroscopic as a fiber having the same degree of grafting prepared by grafting ready-made viscose fiber with acrylonitrile.

EXAMPLE 24

A methyl methacrylate graft copolymer of cellulose (degree of grafting: 65 percent) was dispersed into ethyl acetate.

NO₂ was added to dissolve the graft copolymer of cellulose and make a 5 percent solution. The solution was cast on a glass plate to give a film. After drying at 40° C. for about 30 minutes, the dried film was soaked in a 25 percent glycerol bath.

The film obtained was transparent and soft.

EXAMPLE 25

A styrene graft copolymer of cellulose (degree of grafting: 130 percent) was dissolved in a solution of N-methyl 2-pyrrolidone and NO₂ to make a 4 percent solution. 4 parts of polystyrene were added to 100 parts of the solution and a mixed solution containing polystyrene and a styrene graft copolymer of cellulose was obtained.

Films and fibrids were made from the solution.

EXAMPLE 26

2 parts each of a styrene graft copolymer of cellulose (degree of grafting: 65 percent) and a vinyl acetate graft copolymer of cellulose (degree of grafting: 25 percent) were dispersed into a mixed solvent containing 30 parts of ethyl acetate and 70 parts of toluene, and 5 parts of NO₂ were added to dissolve the graft copolymers. The solution obtained

EXAMPLE 27

2 parts of a soluble sulfite pulp, 1 part of an ethyl acrylate graft copolymer of cellulose (degree of grafting: 125 percent) and 2 parts of polyvinyl chloride were dispersed into 100 parts of tetrahydrofuran. 6 parts of $NO_2$ were added and, a transparent and viscous solution was obtained.

By this method, a three-component mixed solution consisting of cellulose, a graft copolymer of cellulose and high molecular weight compound could be produced.

EXAMPLE 28

3 parts of a methyl methacrylate graft copolymer of cellulose and 2 parts of a soluble sulfite pulp were dispersed into 100 parts of ethyl acetate.

10 parts of $NO_2$ were added to produce a mixed solution consisting of a graft copolymer of cellulose and cellulose.

What is claimed is:

1. A cellulose graft polymer solution comprising (1) at least one member selected from the group consisting of cellulose, cellulose esters, and cellulose ethers, grafted with at least one member selected from the group consisting of ethyl methacrylate, vinyl acetate, methyl methacrylate, ethyl acrylate, styrene, acrylonitrile, n-butyl methacrylate, methyl acrylate, n-butyl acrylate, methacrylic acid, acrylic acid, acrylonitrile-styrene, styrene-vinyl acetate, styrene-butadiene, and acrylonitrile-butadiene, (2) at least 1–12 parts of nitrogen dioxide per 3 parts of said cellulose graft copolymer, and (3) a cellulose graft copolymer solvent comprising at least one polar organic solvent free of active hydrogen atoms.

* * * * *